(12) United States Patent
Katayama

(10) Patent No.: US 6,533,475 B2
(45) Date of Patent: Mar. 18, 2003

(54) INSTANT PHOTO FILM PACK AND METHOD FOR PRODUCING THE SAME

(75) Inventor: Masaya Katayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/861,573

(22) Filed: May 22, 2001

(65) Prior Publication Data

US 2001/0046386 A1 Nov. 29, 2001

(30) Foreign Application Priority Data

May 24, 2000 (JP) ........................................ 2000-152359
May 25, 2000 (JP) ........................................ 2000-155353

(51) Int. Cl.$^7$ .............................................. G03B 17/26
(52) U.S. Cl. ........................................ 396/517; 396/527
(58) Field of Search ............................ 396/30, 32, 34, 396/36, 527, 517; 206/455

(56) References Cited

U.S. PATENT DOCUMENTS 4,637,703 A   1/1987  Ono et al. .................. 354/276
4,804,988 A * 2/1989  Hashimoto et al. ......... 206/455
6,192,197 B1  2/2001  Ono ............................ 396/30

FOREIGN PATENT DOCUMENTS

JP   6-87155   10/1987   ............ G03C/8/42

* cited by examiner

Primary Examiner—Russell Adams
Assistant Examiner—Arthur A Smith
(74) Attorney, Agent, or Firm—Sughrue Mion, PLLC

(57) ABSTRACT

A pack case includes a case body, a bottom cover and a pressure plate, which are formed from plastic material. On lateral walls of the case body is provided ribs that are fit into engaging grooves formed in spaces surrounded by a bottom plate and both lateral walls of the bottom cover. The lateral walls have projections, bottom surfaces of which are inclined to fit the inclination of top surfaces of the ribs. Lateral walls of the case body are inclined such that inclination angle in an upper portion is larger than that in a lower portion. A sponge sheet for preventing deviation of an instant photo film unit is attached to the bottom cover. After inserting projections on the bottom cover into holes of the sponge sheet, the projections are deformed by pressure and heat, so that the projections are cut into the sponge sheet.

22 Claims, 10 Drawing Sheets

INSTANT PHOTO FILM PACK AND METHOD FOR PRODUCING THE SAME

BACKGROUND OF THE INVENTION

1. Field of the Invention

The present invention relates to an instant photo film pack that is formed from plastic material and contains instant photo film units of peel-apart type.

2. Background Arts

As a self-developing instant photo film unit, a mono-sheet type and a peel-apart type are well-known. In U.S. Pat. No. 4,637,703 (corresponding to JP-B (Japanese Patent Publication No.) 5-62725) and JP-B No. 6-87155, the peel-apart type instant photo film unit is disclosed, wherein a photosensitive sheet and an image receiving sheet are contained in a pack case in a separated manner. Ten sheets of instant photo film units (hereinafter referred to as film unit) are stacked inside the pack case, to provide a instant photo film pack (hereinafter referred to as film pack) on the market.

The pack case is comprised of an case body, a bottom cover and a pressure plate. The case body is an upper component of the pack case, and has a box shape of a substantially rectangular. The case body has an exposure opening in a top wall, and a bottom opening in a bottom wall. The case body is formed from plastic by injection molding, and effectively shield ambient light at corners of the pack case. The bottom cover is a bottom component, and covers the bottom opening of the case body. The pressure plate is located between the case body and the bottom cover, and biased toward the upper surface of the case body by a spring member provided on the bottom cover, to press the photosensitive sheet against a top inner wall of the case body. The image receiving sheet is disposed below the pressure sheet. The photosensitive sheet and the image receiving sheet, contained respectively above and below the pressure plate, are connected with each other by a withdrawing sheet and a mask sheet. The bottom cover and the pressure plate are made of thin metal plates.

A bottom edge of a front wall of the case body is in such a position that its level is higher than the a bottom edges of a rear wall and lateral side walls. Thus, a passage opening for advancing the film unit outside is formed under the front wall when the bottom cover is coupled to the case body so as to cover the bottom opening.

The film pack is loaded in a pack holder which includes a pair of spread rollers and an ejection door. When the film pack is unused, the exposure opening is closed by a light-shielding sheet for shielding the photosensitive sheet from ambient light. When the film pack is loaded, one end of the light-shielding sheet is protruded from a tab exit slot formed through a top wall of the pack holder. The other end of the light-shielding sheet is fastened to the pressure plate together with the film units by staples by use of a stapler. When the protruding one distal end of the light-shielding sheet is manually pulled out, the other end thereof is torn away from the staple-fastened portion by means of a perforation line or notches, so the light-shielding sheet is drawn out through the tab exit slot. Thus, a first one of the photosensitive sheets is exposed through the exposure opening, and becomes ready for photography. One distal end of the light-shielding sheet is attached to one distal end of a tab. The other distal end of the tab is attached to the withdrawing sheet of the first film unit. When the light-shielding sheet is removed, the other distal end of the tab is protruded from the tab exit slot.

The tab is manually pulled out through the tab exit slot after exposure. Then, one end of the withdrawing sheet is moved to pass between the spread rollers, and is advanced out of the pack holder through the ejection door. Afterwards, the withdrawing sheet is manually pulled out, by which the photosensitive sheet comes to a position opposite to the image receiving sheet and pressed onto it by passing between the spread rollers. Concurrently, a developing solution pod, provided on the withdrawing sheet, is ruptured to spread developing solution between the photosensitive sheet and the image receiving sheet. After the film unit is completely pulled out of the spread rollers, a predetermined time for development and fixation is elapsed. Then, a positive image is appeared on the image receiving sheet, which is peeled away from the film unit to provide a photographic print.

When the image receiving sheet is moved while the tab is pulled out, deviation between the image receiving sheet and the photosensitive sheet is occurred. Then, a sponge pad is provided on the bottom cover. The sponge pad is held by folding a pair of tongue-shaped clip plates that are formed by making a cut into the bottom cover. While the tab is pulled out, the sponge pad comes in contact with the image receiving sheet, and the frictional force between the sponge pad and the image receiving sheet prevents the image receiving sheet from moving until the photosensitive sheet is overlapped completely with the image receiving sheet.

As set forth, the case body is formed from plastic material by injection molding, whereas the pressure plate and the bottom cover are made of thin metal plates. If one desires to abandon or recycle the film pack, it is needed to disassemble the film pack and classify the parts into same elements. In order to reduce the burden of classification, U.S. Pat. No. 6,192,197 discloses a film pack, in which the case body, bottom cover and the pressure plate are formed from plastic by injection molding.

However, in case of forming the bottom cover and the pressure plate from plastic material, since the bottom cover is poorer in strength than the conventional one made of metal plate, the developing solution pod is likely to be ruptured by external force prior to photography. Moreover, the bottom cover is likely to be off from the case body. In that case, the film unit is exposed to ambient light through the bottom opening. Thus, it is necessary to form the bottom cover thicker than the conventional one. In molding the bottom cover thicker without decreasing the internal size of the film pack, the film pack becomes larger than the conventional one, so it is impossible to load the film pack in the loading chamber. Moreover, in case of reducing the space for engaging the bottom cover with the case body, engagement between the case body and the bottom cover is weakened, which causes separation of the bottom cover.

On the other hand, it is necessary to provide a sponge pad for providing frictional force to the image receiving sheet. In case of forming the bottom cover from plastic material, which is hard to bend to form clip plates like the conventional bottom plate, it is difficult to hold the sponge pad tightly. Moreover, separation of the sponge pad is required for classification after use the film pack. When the sponge pad is tightly stuck to the bottom plate by use of an adhesive or the like, refuse of the sponge is remained on the bottom lid after peeling off the sponge pad. In that case, it is difficult to make an effective classification of the film pack.

SUMMARY OF THE INVENTION

In view of the foregoing, an object of the present invention is to provide an instant photo film pack for preventing rupture of the developing solution pod and separation of the plastic-formed bottom cover by increasing strength without enlarging the pack size.

Another object of the present invention is to provide an instant photo film pack for securing an removably attachable sponge pad to the bottom cover formed from plastic material.

To achieve the above objects, an instant photo film pack of the present invention is comprised of a box-shaped case body, a pressure plate and a bottom cover which are formed from plastic material, and a pair of ribs provided on the bottom of lateral walls of the case body. The case body has a top wall with an exposure opening for allowing exposure to a photosensitive sheet. The pressure plate is located inside the case body between a plurality of stacked photosensitive sheets and a plurality of stacked image receiving sheets, and presses the photosensitive sheets toward said exposure opening. The bottom cover includes a bottom plate for covering bottom side of the case body, lateral walls stretched upward from the bottom plate, and engaging ridges integrated with the lateral walls and projected toward inside of the bottom cover. Bottom surfaces of the engaging ridges have inclined planes that increases the height of the engaging ridges gradually toward edges thereof, and top surfaces of the ribs is inclined so as to fit the inclined planes. Thus, ribs are fit into engaging grooves formed in spaces surrounded by the bottom plate, the lateral walls and the engaging ridges, so the bottom cover is firmly coupled to the case body without being away from the case body by external force.

The lateral walls of the case body is inclined to narrow the width of the case body gradually toward the top wall. Inclination of the lateral wall in an upper portion is larger than that in a lower portion. Thereby, it is possible to increase the area where the top surface of the ribs and the bottom surface of the engaging ridges are contacted to each other, so the strength of the engagement between the case body and the bottom cover is increased without increasing the size of the film pack.

By sliding the bottom cover after insertion of the ribs into the engaging grooves, a pair of engaging projections provided on the bottom cover is fit into engaging recesses provided in the ribs, and rear walls of the case body and the bottom cover are contacted to each other. So it is possible to fix the bottom cover at a predetermined position of the case body.

In order to prevent rupture of the processing solution pod, the bottom plate has a pair of pod protection ridges on both inner lateral sides of an area on which a developing solution pod of the instant photo film unit is positioned. Moreover, the bottom cover has a plurality of pod protection projections on inner corner of the bottom rear wall and the bottom plate, and mark for indication prohibition of depression on an area of outer wall where the developing solution pod is positioned.

In the embodiment, a sponge sheet is attached to a leading portion of the bottom cover for preventing image receiving sheets from moving by frictional force. The sponge sheet has two holes arranged in the direction perpendicular to the withdrawing direction of the instant photo film unit. Two projections are integrated with the bottom cover for inserting into the holes. After insertion, the projections are subjected to pressure and heat, so that the projections are deformed to cut into the sponge sheet. Thus, it is possible to attach the sponge sheet firmly on the bottom cover without having refuse in disassembling the film pack.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
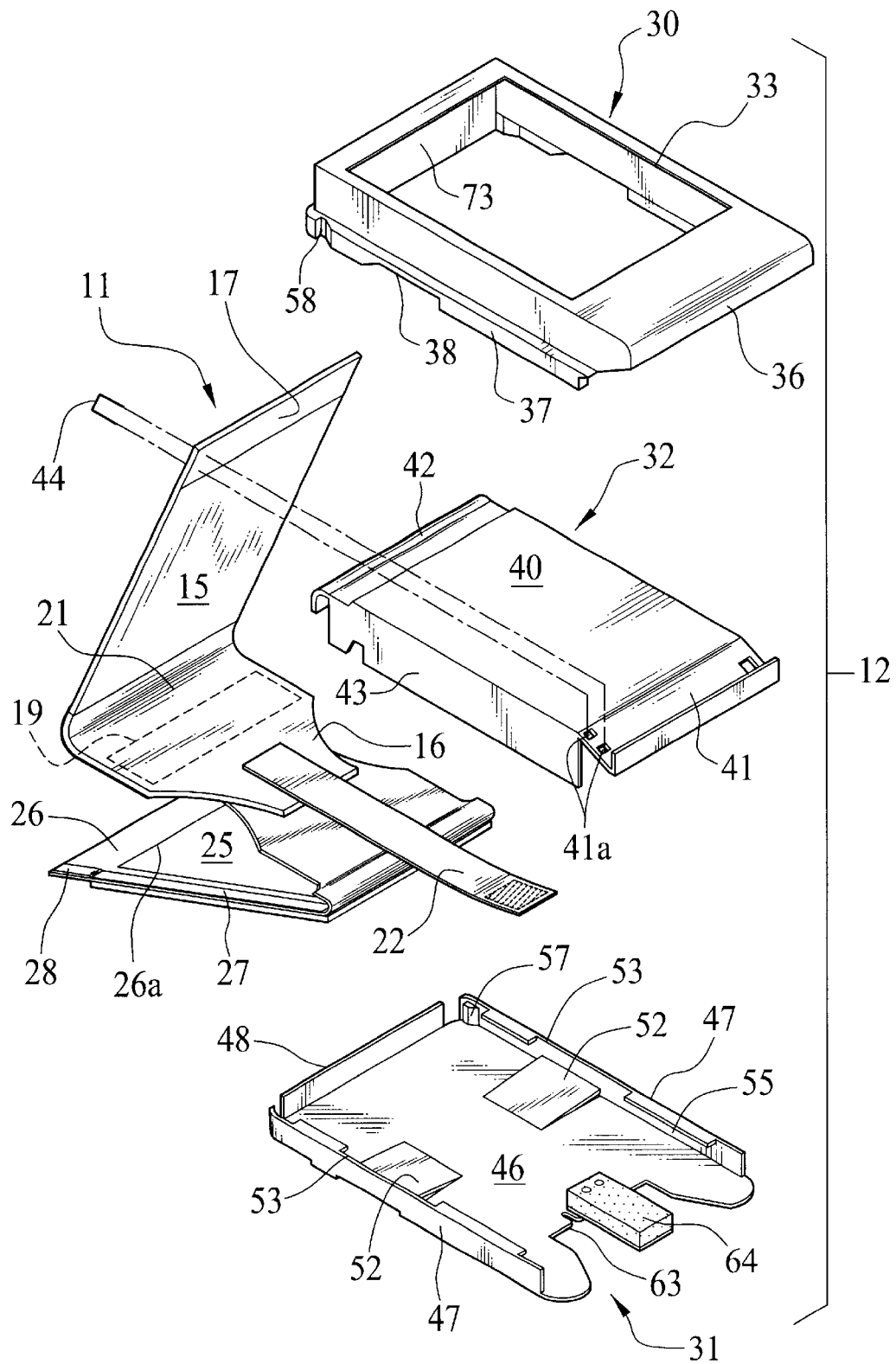
FIG. 1 is an exploded perspective view showing an instant photo film pack of the present invention.

As shown in FIG. 1, a film pack 10 includes a film unit 11 and a pack case 12. In an unused state, a top side of the film unit 11 is covered with a light-shielding sheet 13 (see FIGS. 9 and 10). Ten sheets of film units 11 are contained in the pack case 12, for example, but only one film unit 11 is depicted in FIG. 1 for the purpose of simplification of the drawing.

The light-shielding sheet 13 is manufactured by the following processes. A base sheet, having a thickness of 0.11 mm and a weight per unit area of 123 g/m², is made from composite pulp, in which 30% of conifer pulp and 70% of hardwood pulp are contained, by adding cationic polyacrylamide as strength agent, rosin derivative as sizing agent, aluminum sulfate as fixer agent, and polyvinyl alcohol including calcium carbonate and titanium oxide as surface sizing agent. The base sheet is subjected to photogravure by use of composite resin of polyamide and nitrocellulose. Then, a microcrystalline wax is soaked on the photogravure surface or both surfaces of the base sheet to form overcoat layer (protection layer), such that the slip factor of the overcoat layer is equal to or less than 0.2. A weight per unit area of the base sheet is usually from 50 g/m² to 210 g/m², preferably from 100 g/m² to 160 g/m². A thickness of the base sheet is usually from 0.04 mm to 0.20 mm, preferably from 0.09 mm to 0.15 mm.

The film unit 11 includes a photosensitive sheet 15, a withdrawing sheet 16, a tab 22 and an image receiving sheet 25. The withdrawing sheet 16 is connected with the leading edge of the photosensitive sheet 15. On the withdrawing sheet 16 is provided a developing solution pod 19 for containing developing solution. A funnel 19 is provided between the photosensitive sheet 15 and the developing solution pod 19 for conducting the developing solution toward the photosensitive sheet 15. A tab 22 is stuck to the leading end portion of the withdrawing sheet 16.

The image receiving sheet 25 is provided for displaying a positive image, and is stuck to a mask sheet 26 through a weak sealing layer. The mask sheet 26 includes an opening 26a that is corresponded to the image size, and the leading end thereof is connected with the withdrawing sheet 16. A pair of relatively thick rails 27 are stuck on both lateral ends of the mask sheet 26 with respect to a withdrawing direction of the film unit 11. A pair of protection chips 28, made of hard plastic, are connected with the trailing ends of the rails 27. When the film pack 11 is contained in the pack case 12, the protection chips 28 are located at both lateral sides of the developing solution pod 19. The developing solution pod 19 is located in the space provided between the protection chips 28, so it is possible to prevent rupture of the developing solution pod 19 by external force.

The pack case 12 is consisted of a case body 30, a bottom cover 31 and a pressure plate 32, all of which are formed by means of injection molding from plastic material. The case body 30 is an upper component of the pack case 12, and is shaped in a box of a rectangular parallelpiped. The bottom lid 31 is a lower component of the pack case 12, and the pressure plate is positioned between the case body 30 and the bottom cover 31. Examples of the plastic material is polystyrene, ABS resin, polyphenyl ether (PPE), polycarbonate, polypropylene and other materials with suitable to injection molding. Light-shielding material, carbon black for example, is compounded with the plastic materials at about 1 wt. % for the purpose of light-shielding.

It is also effective to use biodegradable plastic in order to improve suitability to waste disposal of the pack case 12. Examples of the biodegradable plastic are synthetic resin, material produced by fermentation, and material mainly including natural material, respectively to be precise, fatty acid polyester like poly lactic acid, polyester produced by microbes, and polyvinyl alcohol (PVA) mainly including starch.

Figure 2:
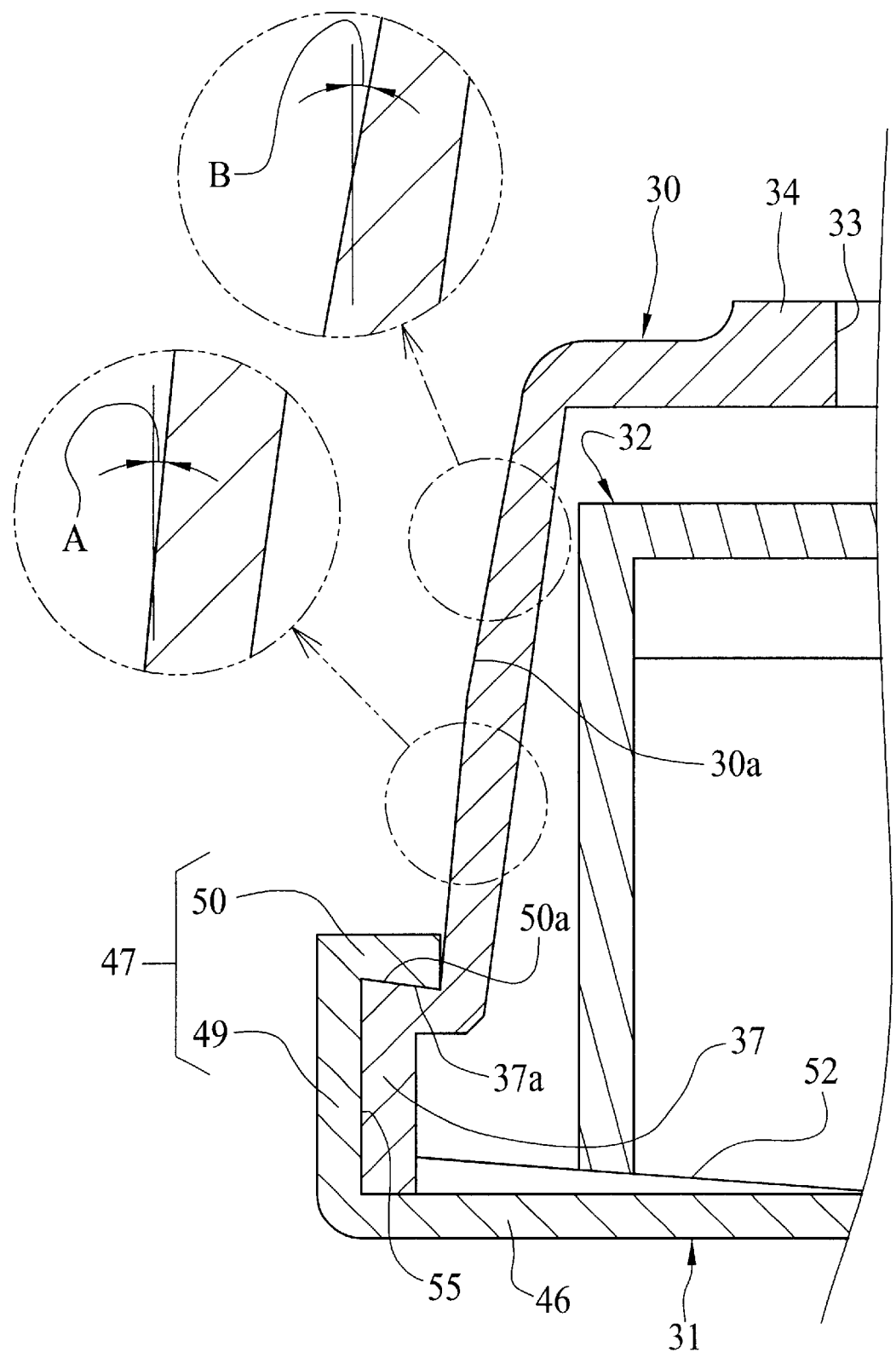
FIG. 2 is a partial schematic sectional view showing the film pack of FIG. 1.

Through a top wall of the case body 30 is formed an exposure opening 33, around which is protruded upward to form an exposure frame 34 (see FIG. 2). In the case body 30, a bottom edge of a front wall 36 is positioned in a level higher than a bottom edge of the rear wall and bottom edges of lateral side walls. A passage opening for advancing the film unit 11 is defined between the front wall 36 and the bottom cover 31. Ribs 37 are formed integrally with the lower end of respective lateral walls of the case body 30, and cutouts 38 are formed in a bottom of the respective ribs 37. As shown in FIG. 2, a top surface 37a of the rib 37 is inclined upward such that a height of the rib 37 is increased gradually toward the lateral edge.

A lateral side wall 30a of the case body 30 is inclined to decrease a width of the case body 30 gradually toward the top wall of the case body 30. This inclination is formed for the purpose of readily taking the case body 30, which is cooled and became solid in a mold, in injection molding. Inclination of the lateral side wall 30a is larger in an upper portion (indicated by an angle B) than that in a lower portion (indicated by an angle A). Thereby, it is possible to increase an area of the upper surface 37a of the rib 37 without increasing the size of the case body 30.

In FIG. 1, the pressure plate 32 is constituted by a flat middle wall 40, a retaining portion 41, a semi-cylindrical portion 42 and lateral walls 43. The retaining portion 41 is provided on a front end of the flat middle wall 40, and has a pair of retaining holes 41a in one end portion. The retaining holes 41a are used for fastening an end portion of the film unit 11 and the light-shielding sheet 13 by staples 44. The semi-cylindrical portion 42 is provided on a rear end of the flat middle wall 40, and causes each photosensitive sheet to turn back in response to withdrawing the film unit 11. The lateral walls 43 are provided on lateral sides of the flat middle wall 40 and oriented downward by bending. Even when the pressure plate 32 inside the case body 30 is shifted to the uppermost limit position, a level of a bottom edge of the lateral walls 43 are located within a vertical range of the cutouts 38. That is, heights of the cutouts 38 and the lateral walls 43 are so determined that upper edges of the cutouts 38 are not located in a level lower than a bottom edge of the lateral walls 43 irrespective of vertical level of the pressure plate 32 inside the case body 30.

The bottom cover 31 has a bottom plate 46, lateral side walls 47, a rear wall 48 and transmission flaps 52. As shown in FIG. 2, the lateral wall 47 is consisted of a vertical plane 49 and an engaging ridges 50. The vertical plane 49 is oriented upward from the bottom plate 46, and the engaging ridge 50 is oriented inward from the upper edge of the vertical plane 49. In the engaging ridge 50 is formed a cutout 53 for allowing insertion of the transmission flap 52. An engaging groove 55 for engaging with the rib 37 of the case body 30 is formed in the space surrounded by the middle plate 46, the vertical plane 49 and the engaging ridge 50. In order to fit the upper surface of the rib 37, a bottom surface 50a of the engaging ridge 50 is inclined such that the width of the engaging groove 55 is decreased gradually toward the edge of the engaging ridge 50.

A pair of projections 57 is provided on an inner surface of a rear end portion of the vertical plane 49. Respective projections 57 is engaged with recess 58 formed in the rib 37. The rear wall 48 is oriented upward from a rear end of the bottom plate 46. The transmission flaps 52 are formed with the bottom plate 46, and functions as biasing force transmission means for transmitting biasing force of spring plates 61 of a pack holder 61 (see FIGS. 9 and 10).

Figure 3:
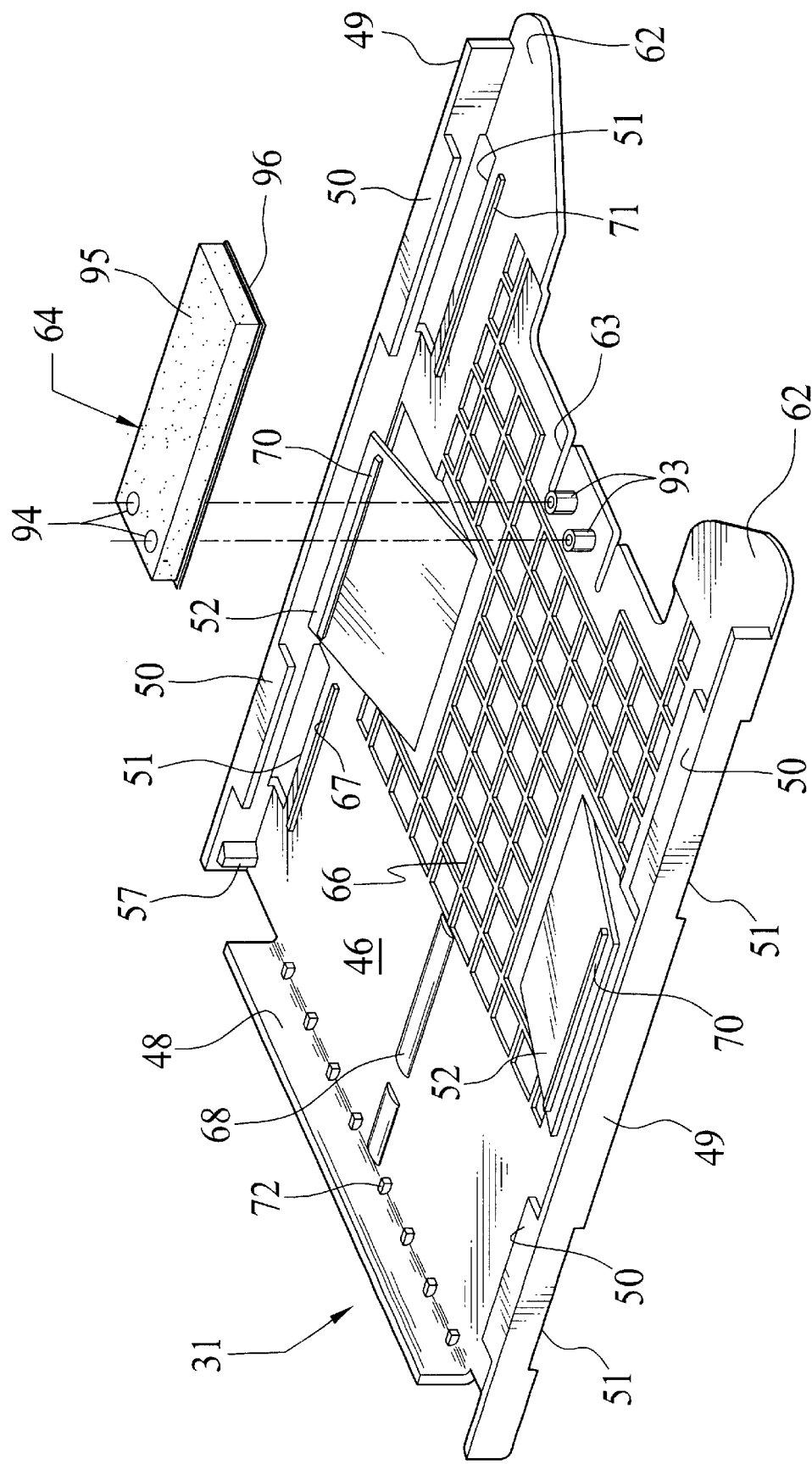
FIG. 3 is a perspective view showing a bottom cover and a sponge pad.
Figure 4:
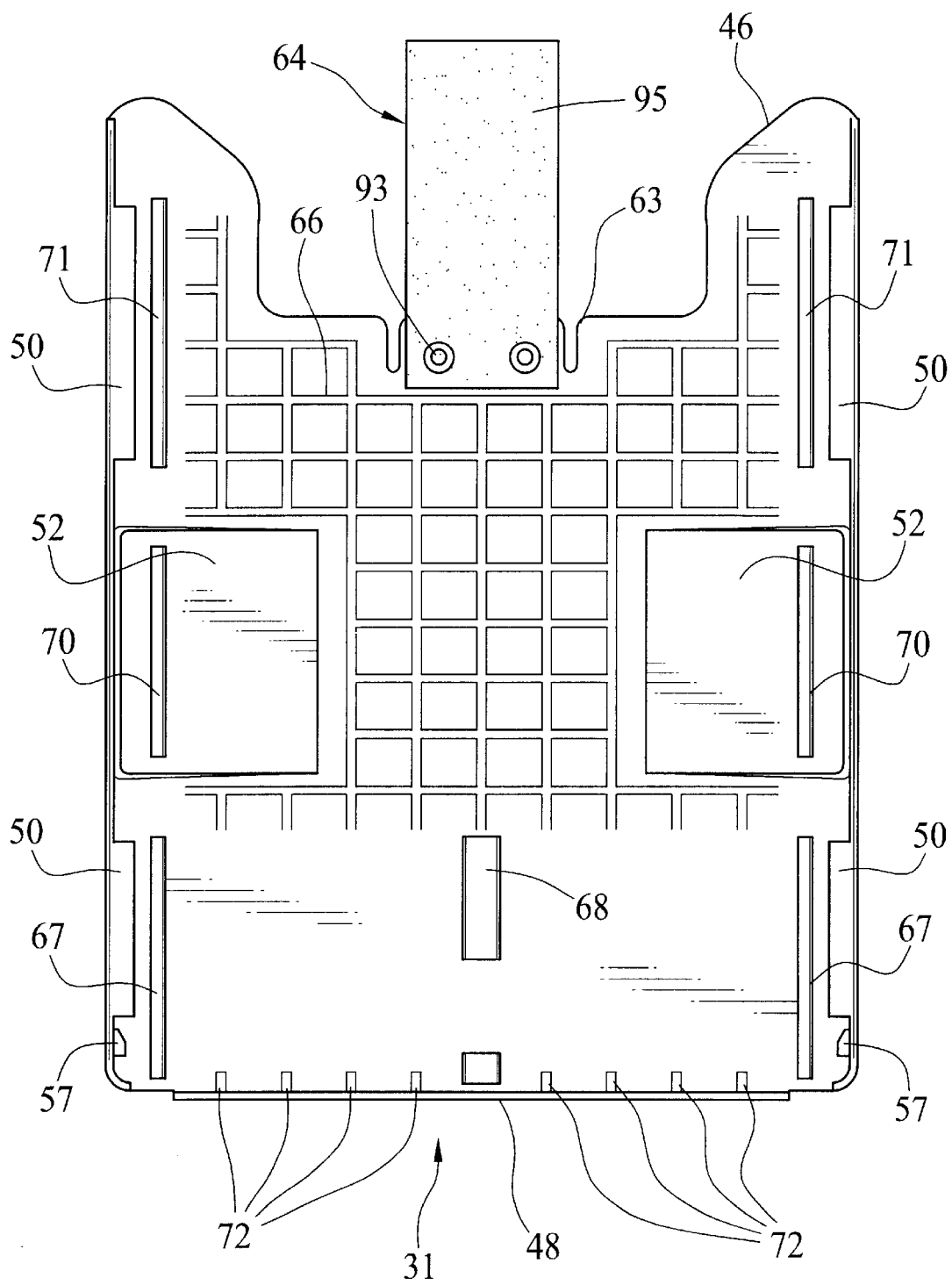
FIG. 4 is a top plan view of the bottom cover with sponge pad.

As shown in FIGS. 3 and 4, on a top surface of the bottom plate 46 are provided latticed reinforcement ribs 66, pod protection ridges 67, linear reinforcement rib 68, unit guide ridges 70, 71 and projections 72. The latticed reinforcement ribs 66 are formed in approximately entire area of the bottom plate 46, but not formed in an area on which the developing solution pod 19 of the film unit 11 is positioned. In the middle of that area, a linear reinforcement rib 68, wider than the latticed reinforcement rib 66, is provided. The pod protection ridges 67, extended in an advancing direction of the film unit 11, are formed on a trailing end portion of the bottom plate 46, where the pod protection chips 28 are positioned. When an external force is applied to a bottom side of the film pack 10, the pod protection ridges 67 are pressed on the pod protection chips 28, for preventing the external force from transmitting to the developing solution pod 19.

The unit guide ridges 70 are formed on lateral end portions of the transmission flaps 52, and the unit guide ridges 71 are formed on leading and lateral end portions of the bottom plate 46. The unit guide ridge 70, 71 and the pod protection ridges 67 come in contact with the both lateral edge of the image receiving sheet 25. When the film unit 11 is pulled out, the image receiving sheet 25 is retained upward by the unit guide ridge 70, 71 and the pod protection ridges 67, so the photosensitive sheet 15 and the image receiving sheet 25 are kept from being caught between the bottom plate 46 and the pressure plate 32. A plurality of the projections 72 are formed on a corner where the bottom plate 46 and the rear plate 48 are crossed to. When external forces are applied to the top and bottom sides of the film pack 10, the projections 72 come in contact with a bottom edge of a rear wall 73 of the case body 30. Thereby, the case body 30 is kept from being pressed by reduction of the inner space of the case body 30.

A pair of leg portions 62 are protruded in the advancing direction from both lateral and leading end portion of the bottom plate 46. A sponge sheet 64 is attached to the leading end portion of the bottom plate 46. The sponge sheet 64 is consisted of a paper base member 96 and a polyurethane sponge 95 which is stuck to a top face of the paper base member 96, and is used for proving frictional force to the image receiving sheet 15. The sponge sheet 64 keeps the image receiving sheet 15 from moving from a predetermined position during pulling the tab 15a for withdrawing an exposed film unit 11. The sponge sheet 64 is extended in the advancing direction, and has two holes 94 in an trailing end thereof. In the middle of the leading end portion of the bottom plate 46 are formed two cutouts 63, between which two projections 93 are arranged in the direction perpendicular to the advancing direction. Each of the projections 93 have a shape of hollowed cylinder, and is fit in the hole 94 of the sponge sheet 64.

Figure 5A:
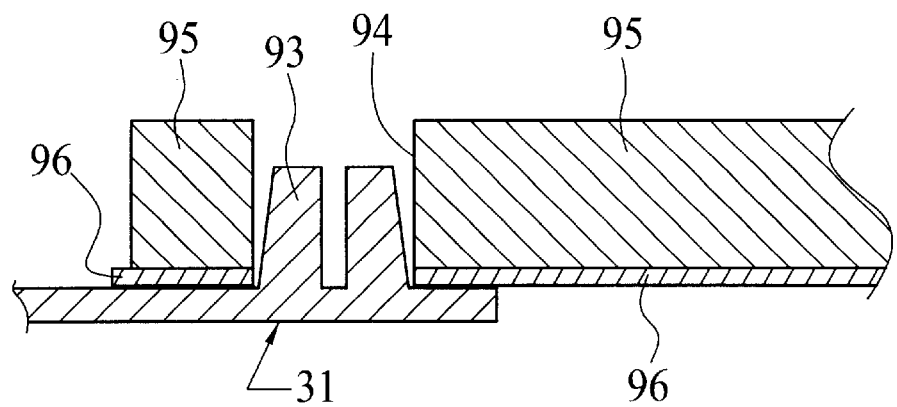
FIGS. 5A to 5C are schematic views showing a process to attach the sponge pad on the bottom cover.
Figure 5B:
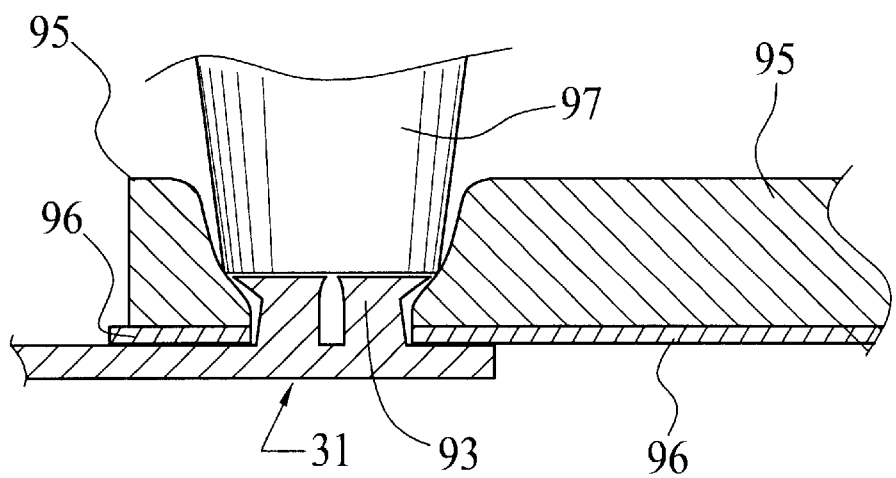
Figure 5C:
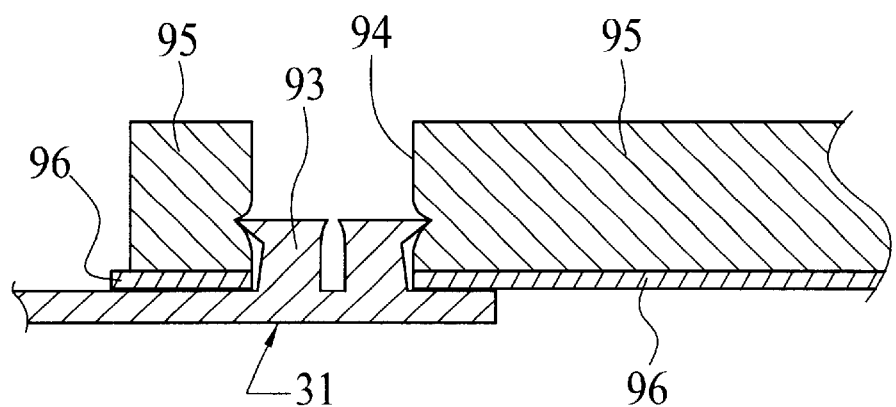
Figure 6:
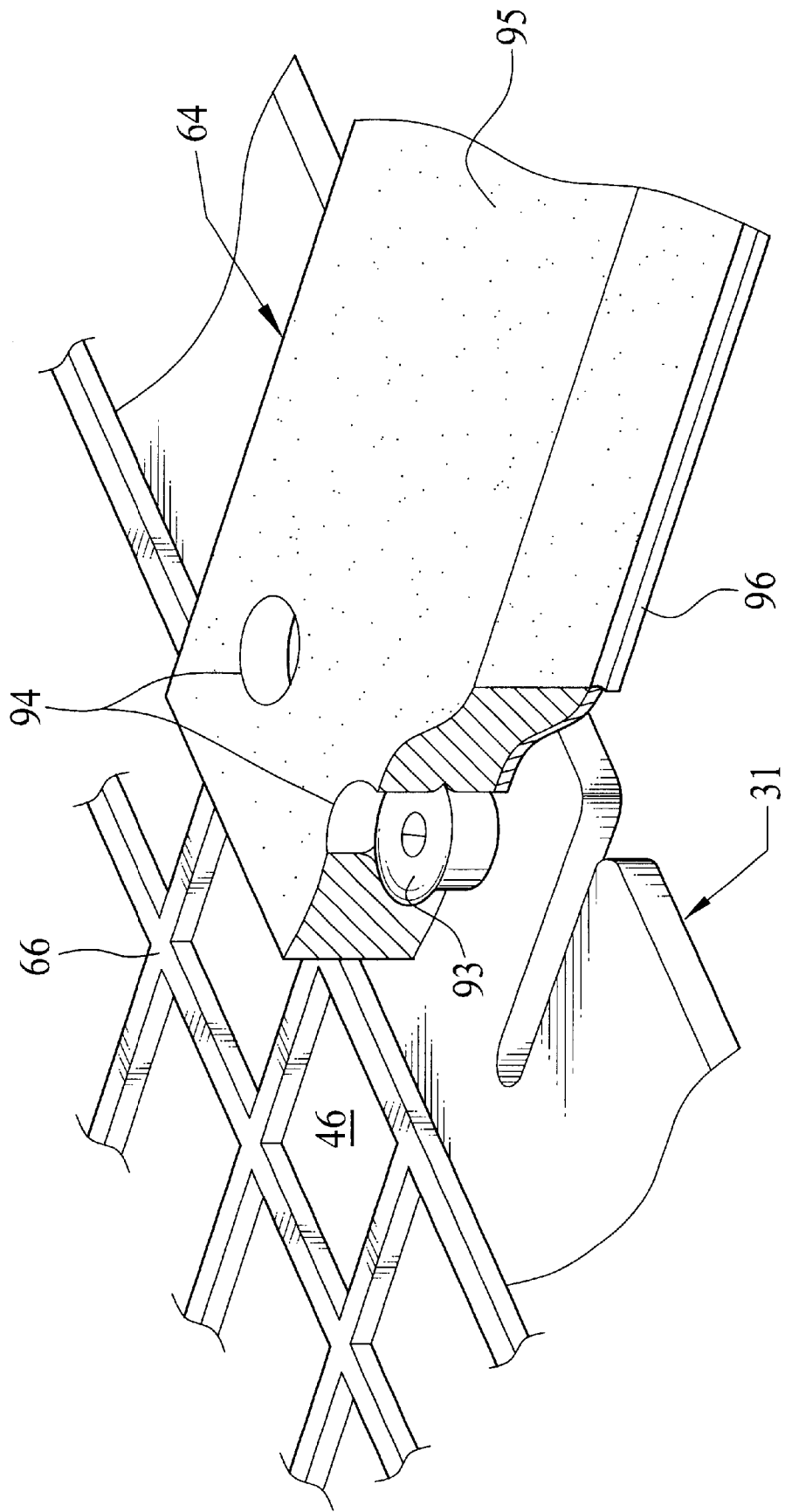
FIG. 6 is a partially cutaway view in perspective of the bottom cover and the sponge pad.
Figure 7:
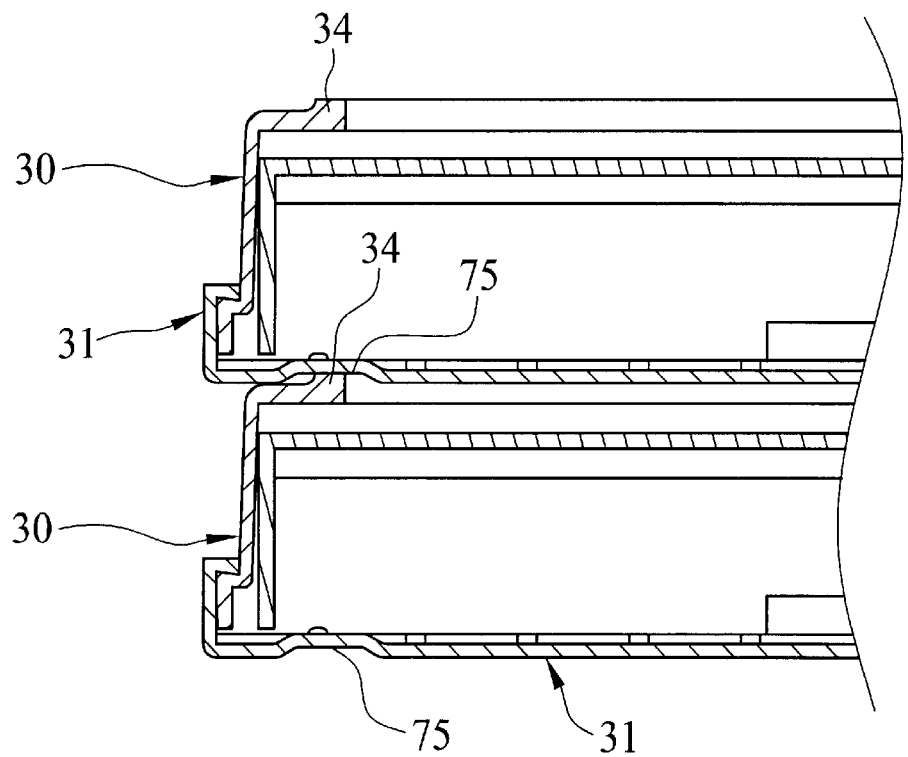
FIG. 7 is a partial schematic sectional view showing the stacked film packs.

In attaching the sponge sheet 64 to the bottom cover 31, each of the projections 93 is inserted into each of the holes 94, as shown in FIG. 5A. The projection 93 has a hollowed cylindrical shape, and is slightly tapered off, so the projection 93 is easy to be inserted. The projection has a height smaller than the thickness of the sponge sheet 64. After putting the sponge sheet 64 on the bottom cover 31, fixation heads 97 come down to contact with the top surfaces of the projections 93, and presses the projections 93 with heats. Then, as shown in FIG. 5B, the projections 93 are deformed such that the top surface thereof is stretched. When the top surface of the projection 93 is larger than the original size of the hole 94 to some extent, the fixation heads 97 move upward to be away from the projections 93. Then, the polyurethane sponge 95 is returned to its original shape, whereas edges of the projections 93 are cut into the polyurethane sponge 95, so that the sponge sheet 64 is fixed to the bottom cover 31, as shown in FIGS. 5C and 6. Since the projection 93 is heated at a predetermined temperature not to melt the polyurethane sponge 95, it is possible to deform only the projection 93, made from plastic material. The projection 93 may have other shape such as a square pillar. But the projection having a cylindrical shape is superior in processability, because heat from the fixation head 97 is uniformly conducted.

In the embodiment, the projection 93 has a diameter of 3.5 mm, an inner diameter of 1.8 mm, a height from the bottom plate 46 of 2.5 mm. The hole 95 of sponge sheet 64 has a diameter of 3.6 mm. The projection 93 after fixation process has a height of 1.5 mm, and a top portion thereof has a cross section of approximately inverse triangular. Diameter of the projection 93 and holes 95 are 2 mm to 6 mm, preferably 2.5 mm to 5.0 mm. Inner diameter of the projection 93 is 30% to 70% of the outer diameter thereof, preferably 40% to 60%. Height of the projection 93 is 1.5 mm to 5.0 mm, preferably 2 mm to 4 mm. Height of the projection 93 after fixation process is 30% to 80% of its original height, preferably 40% to 70%.

The sponge sheet 64 attached to the bottom cover 31 do not come off from the projections 93 unless an external force to tear the paper base member 96 is applied to the sponge sheet 64. It is possible to separate the sponge sheet 64 from an used film pack 10, by adjusting strength of the paper base member 96 in consideration of its thickness or the like.

Figure 8:
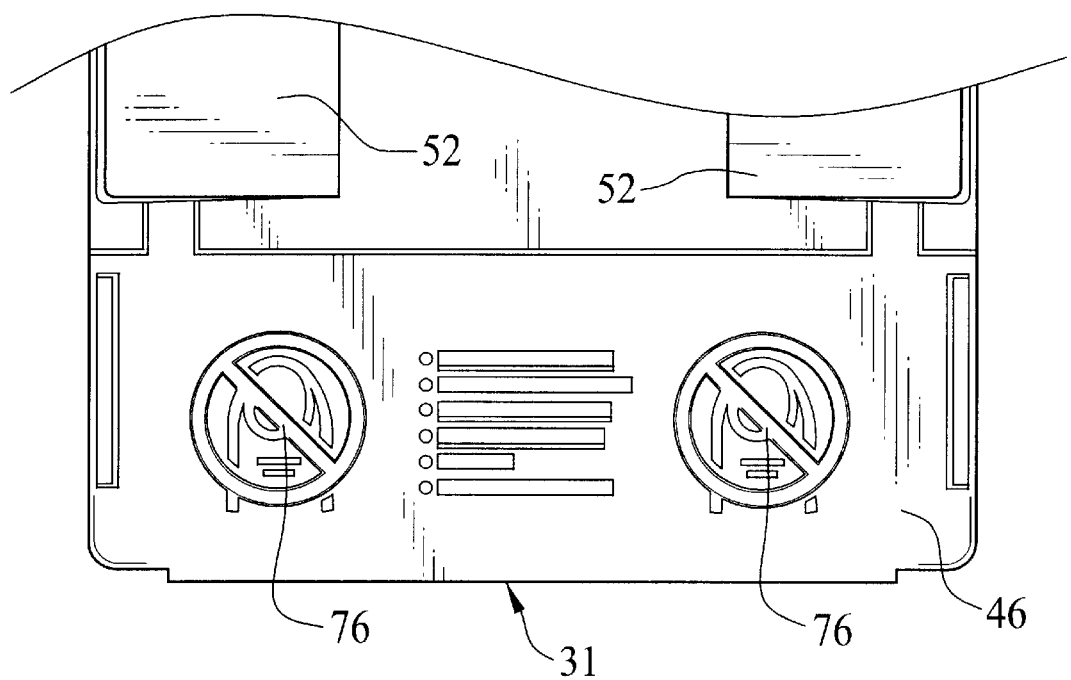
FIG. 8 is an explanatory view showing a mark on the bottom cover for indicating prohibition of depressing the film pack.

FIG. 6 shows an cross section of the stacked film packs 10. In this figure, film units 11 are omitted for the purpose of simplification. In a bottom surface of the bottom cover 31 is formed a hollow 75 to fit the exposure frame 34 of the case body 30. By fitting the exposure frame 34 of the lower film pack 10 to the hollow 75 of the upper filmpack 10, it is possible to pile the film pack 10 on a slightly inclined base without collapse. Moreover, as shown in FIG. 8, two indicators 76 are formed on the outer bottom plate 46 of the bottom cover 31. The indicator 76 is provided in an area below the developing solution pod 19, and indicates to prohibit depression of an area around the indicator 76 for preventing rupture of the developing solution pod 19.

Figure 9:
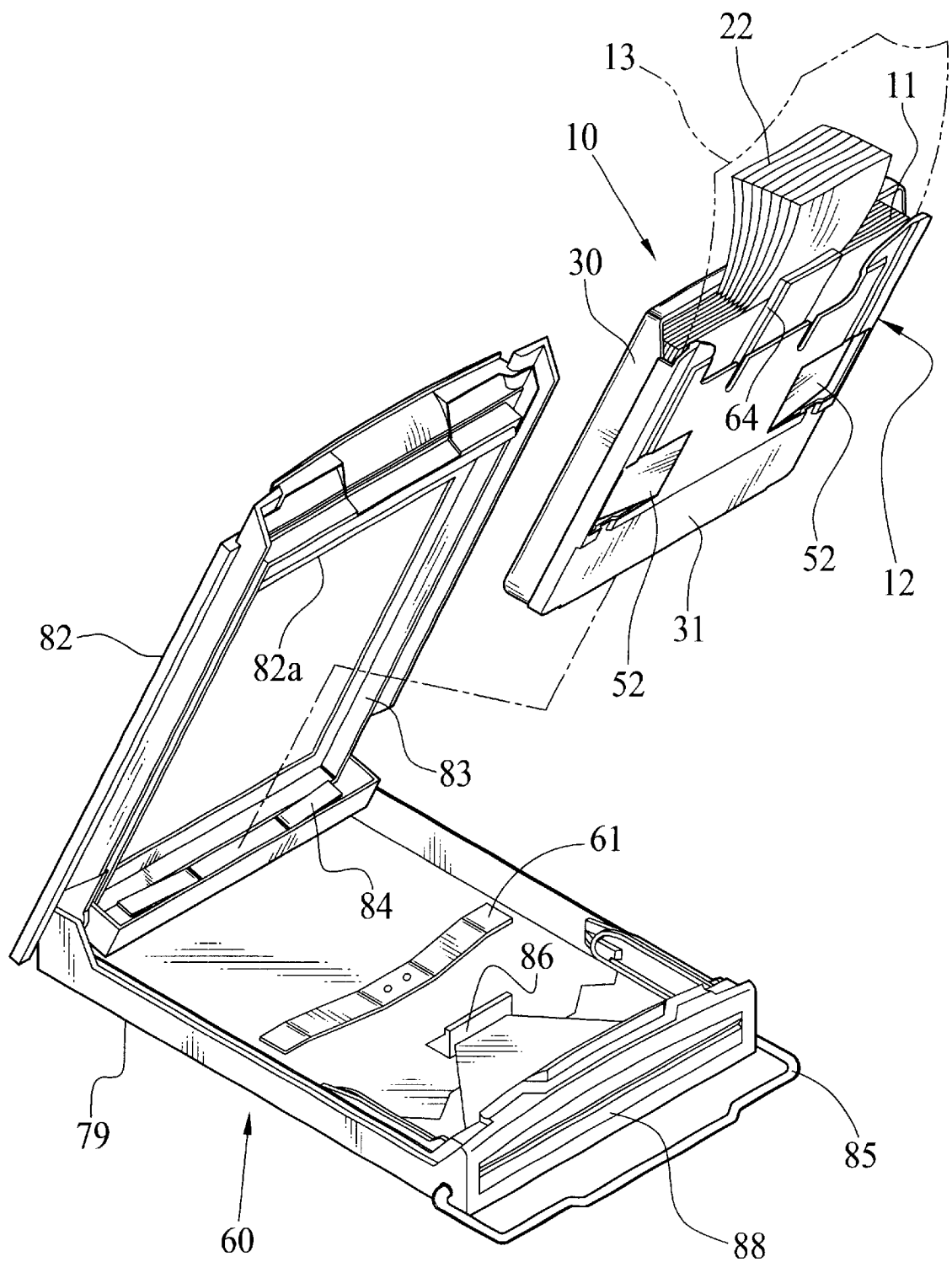
FIG. 9 is a perspective view showing the film pack and a pack holder with a door open.
Figure 10:
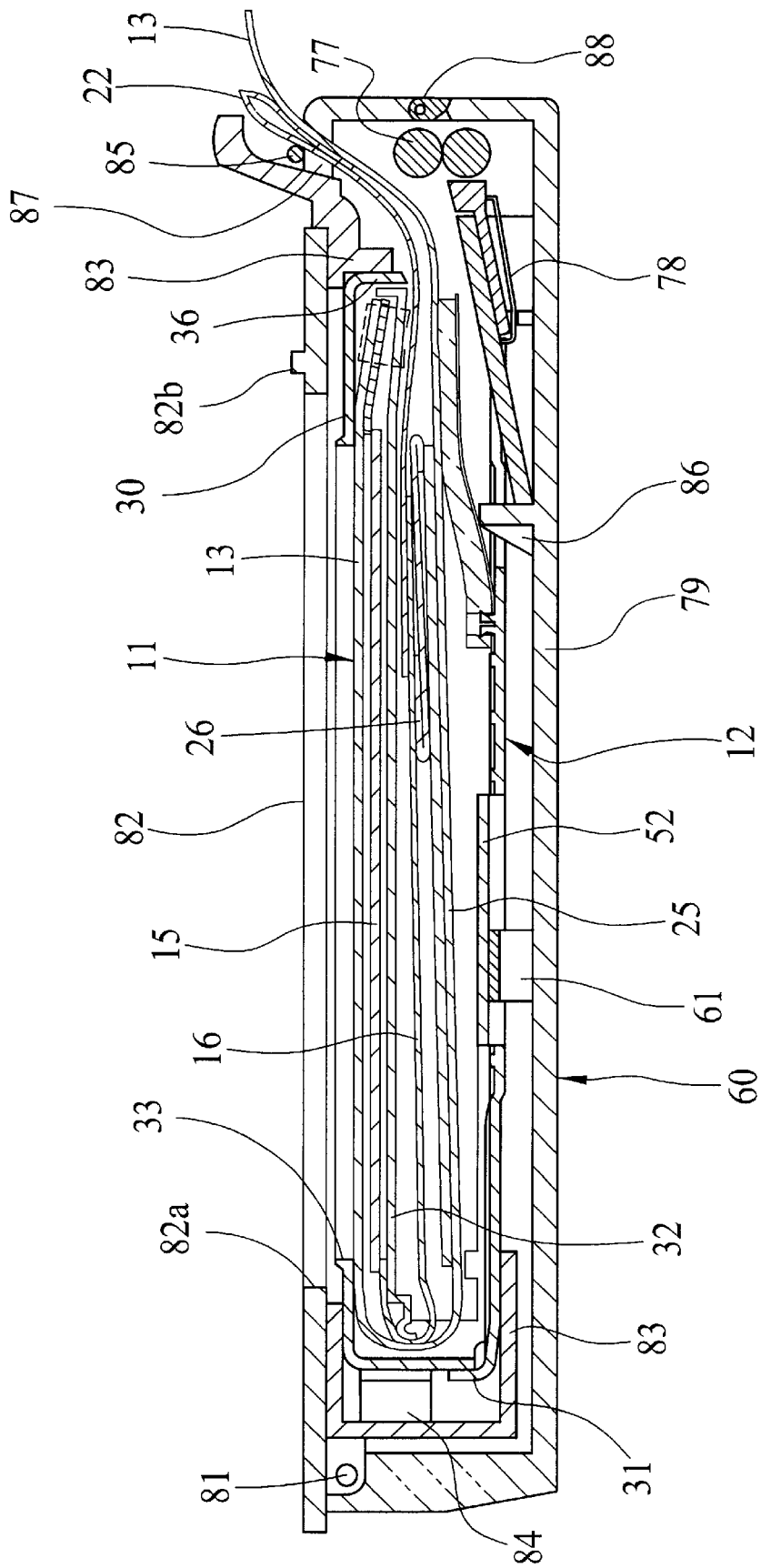
FIG. 10 is a schematic sectional view showing the pack holder with the film pack.

As shown in FIGS. 9 and 10, the film pack 10 is loaded in a pack holder 60 in the same manner as the conventional one. The pack holder 60 is so-called as a camera bag, which is comprised of a first plate 79 and a second plate 82 attached to the first plate 79 in a manner rotatable about a pivot 81. The first plate 79 is provided with a roller assembly 78 including a pair of spread rollers 77. A rectangle-shaped holder opening 82a is formed in the second plate 82. The pack holder 60 is used in such a state that a surface of the second plate 82 is closely contacted to a rear surface of an instant camera. There is a ridge 82b adapted for positioning the pack holder 60 on the back of the camera.

On an inner side of the second wall 82 is provided a pack holding frame 83 into which the film pack 10 is inserted. When the film pack 10 is fit in the pack holding frame 83, a rear wall of the case body 30 is pressed against a spring plate 84 attached to the rear end of the pack holding frame 83, so the front wall 36 of the case body 30 comes in contact with the front end of the pack holding frame 83. Thereby, the film pack 10 is retained stably inside the pack holding frame 83. In case of loading the film pack 10 in a pack holder integrated with the instant camera, the pack holding frame 83 is fixed to the camera body of the instant camera, and the first plate 79 is assembled to the camera body in a rotatable fashion. In that case, the film pack 10 may be loaded in the same way as above.

A spring plate 61 is attached to the inner wall of the first plate 79. When the second plate 82 is closed and held by use of a clip member 85 after loading the film pack 10 in the pack holding frame 83, the spring plate 61 pushes up the transmission flaps 52 of the bottom cover 31. Since the transmission flaps 52 come in contact with the lower edges of the lateral walls 43 of the pressure plate 32, the film pack 10 is pushed upward by the bias of the spring plate 61. The top surface of the pack case 30 is pressed against an inner wall of the second plate 82, so that the film pack 10 is positioned suitably in a direction parallel to an optical axis of a photographic light path.

A projection 86 is provided on an inner wall of the first plate 79. A leading end portion of the sponge sheet 64 is pushed upward by the projection 86 that comes in contact with the rear surface of the image receiving sheet 25. At that time, the sponge sheet 64 is firmly attached to the bottom cover 31 by two projections 93, so the pressing force from the projection 86 does not cause separation of the sponge sheet 64. Moreover, since the projections 93 are arranged in the direction perpendicular to the advancing direction, the sponge sheet 64 is never inclined while the film unit 11 is advanced.

As is well-known in the prior art, a peel-apart type film unit 11 includes the photosensitive sheet 15 and the image receiving sheet 25, which are contained respectively above and below the pressure plate 32 inside the pack case 12. In an unused state, the exposure opening 33 is closed by the light-shielding sheet 13. The photosensitive sheet 15 is located in a space between the exposure opening 33 and the pressure plate 32, and the image receiving sheet 25 is located in a space between the pressure sheet 32 and the bottom cover 31.

When the film pack 10 is loaded in the pack holder 60, a remaining end of the light-shielding sheet 44 is protruded through a tab exit slot 87 that is provided between the first and second plates 79, 82. The other end of the light-shielding sheet 44 is fastened to the pressure plate 32 together with the film units 11 by staples 44. When the protruding end of the light-shielding sheet 13 at the tab exit slot 87 is manually drawn out, the other end of the light-shielding sheet 13 is torn away from the staple-fastened portion by means of a perforation line or notches, so that the light-shielding sheet 13 is separated and drawn out of the pack holder 60 through the tab exit slot 87. Thus a photosensitive sheet 15 of a first film unit 11 comes to lie on the exposure opening 33. Since the spring plate 61 pushes up the pressure plate 31, the photosensitive sheet 15 is moved up and pressed against the inside wall of the pack case 30. Thereby, the photosensitive sheet 15 is positioned constantly inside the pack case 30, in a state ready for exposure. One end of a tab 22 of the first film unit 11 is stuck to the distal end of the light-shielding sheet 13, and the other end of the tab 15a is stuck to the withdrawing sheet 13. When the light-shielding sheet 13 is drawn out, one end of the tab 22 comes to protrude from the tab exit slot 87.

After exposure to the photosensitive sheet 15 is taken through the holder opening 82a and the exposure opening 33, the tab 22 is manually pulled out through the tab exit slot 87. Then the withdrawing sheet 16 moves toward the spread rollers 77. The leading end of the withdrawing sheet 16 moves between the spread rollers 77, pushes open the ejection door 88, and is protruded from the ejection door 88. At this time, attached portion of the tab 22 to the withdrawing sheet 16 is located directly under the tab exit slot 87, so the force to pull the tab 22 peels the tab 22 from the withdrawing sheet 16. When the tab 22 of the first film unit 11 is peeled off, the tab 22 of second one comes to appear through the tab exit slot 87.

Successively, the withdrawing sheet 16 partially protruded from between the spread rollers 77 is manually pinched and withdrawn. Then, the photosensitive sheet 15 is moved horizontally to the left in the figure, is turned back at the semi-cylindrical portion 42 of the pressure plate 32, and is moved under the pressure plate 32 with the photosensitive surface oriented downward. At the same time, the developing solution pod 19 is moved beyond the image receiving sheet 25 and comes near to the spread rollers 77. When the mask sheet 26 for connecting the image receiving sheet 25 with the withdrawing sheet 16 is spread and unfolded, the exposure surface of the photosensitive sheet 15 comes to a position opposite to the image receiving sheet 25. In unfolding the mask sheet 26, frictional force between the sponge sheet 64 and the image receiving sheet 25 keeps the image receiving sheet 25 from moving. When the mask sheet 26 is completely unfolded, the photosensitive sheet 15 and the image receiving sheet 25 are overlapped completely each other and moved toward the spread rollers 77 by the force of withdrawing the withdrawing sheet 16.

Just before the photosensitive sheet 15 and the image receiving sheet 25 enter between the spread rollers 77, the developing solution pod 19 is squeezed by the spread rollers 77. Then, by withdrawing the photosensitive sheet 15 and the image receiving sheet 25, developing solution contained in the developing solution pod 19 is spread between the photosensitive sheet 15 and the image receiving sheet 25 at an uniform thickness. After the film unit 11 is pulled out of the spread rollers 77, a predetermined time for development and fixation is elapsed. Then, a positive image is appeared on the image receiving sheet 25, which is peeled away from the film unit 11 to obtain a photographic print.

When the first film unit 10 is drawn out in that way, pressure of the spring plate 61 on the first plate 79 is transmitted to the pressure plate 32 through the transmission flaps 52. Thereby, the photosensitive sheet 15 of the second film unit 11 is pressed against the inner wall of the case body 30, and is ready for succeeding photography.

Figure 11:
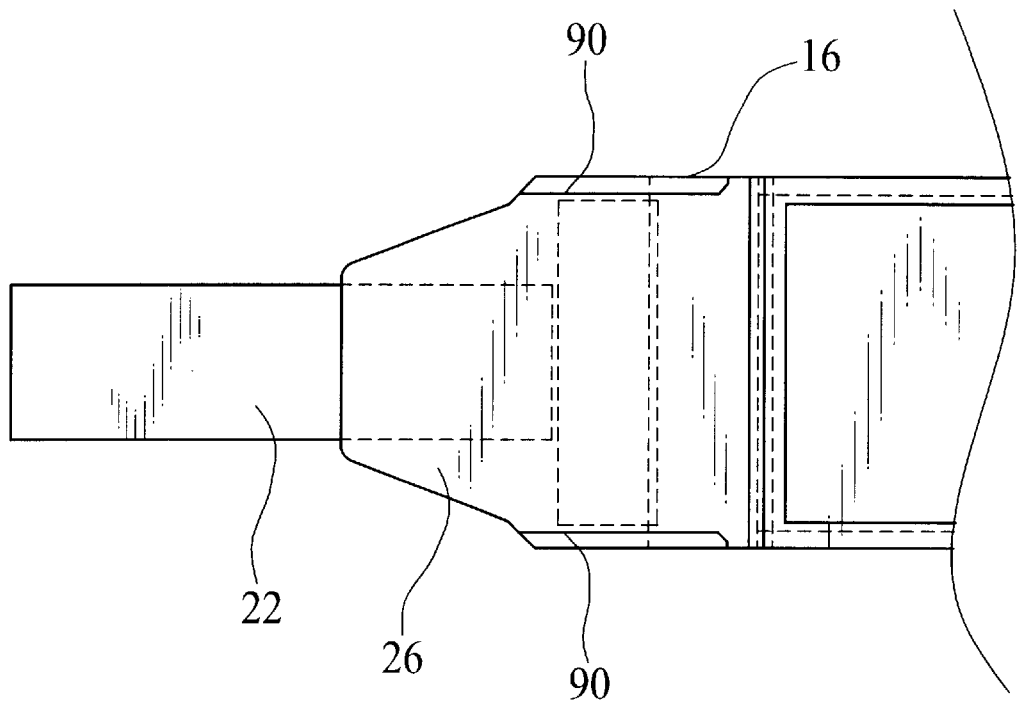
FIG. 11 is an explanatory view showing a film unit contained in the film pack.
Figure 12:
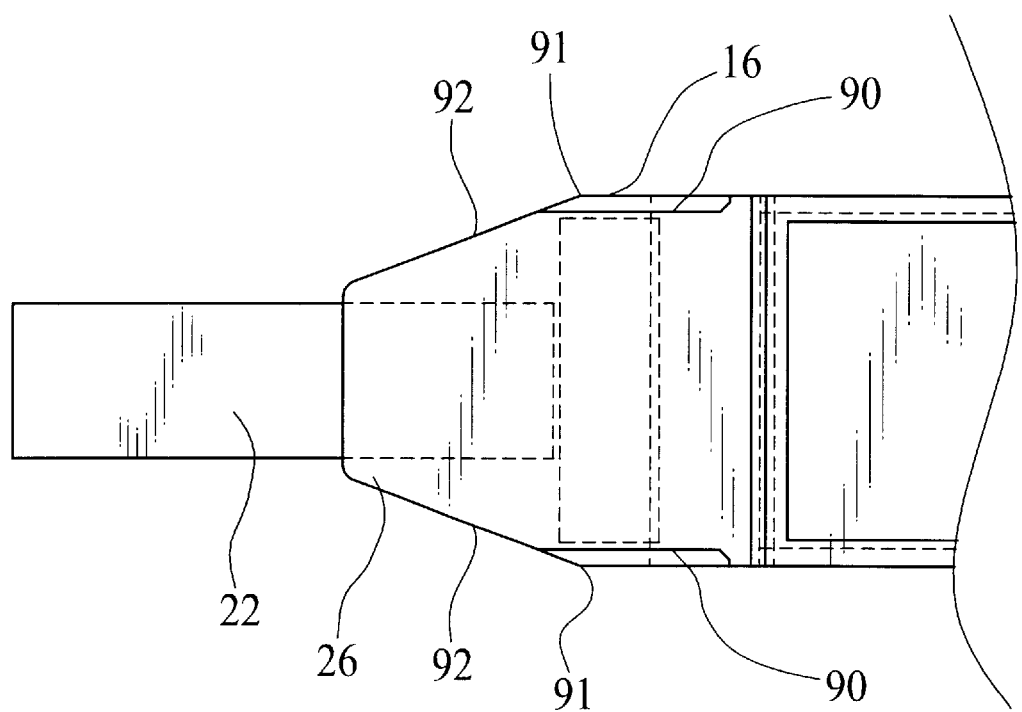
FIG. 12 is an explanatory view showing a film unit of another embodiment.

While passing a conventional film unit between the spread rollers 77 by withdrawing operation, a corner portion of the mask sheet 26 is caught between the lateral plate 43 and the bottom cover 31, so the photosensitive sheet 15 can be deviated from the appropriate position to lay completely on the image receiving sheet 25. In this embodiment, the film unit 11 is the same as that disclosed in JP-B 6-87155. In FIG. 11, a pair of cutouts 90 are formed in leading corners of the mask sheet 26, which prevents the mask sheet 26 from being caught between the lateral plate 43 and the bottom cover 31. It is more preferable to form lines 92 from the leading end to the corner portions 91 of the withdrawing sheet 26.

Next, operation of the above configuration will be described. In manufacturing the film pack 10, the sponge sheet 64 is put on the bottom plate 46 by inserting the projections 93 into the hole 94 of the sponge sheet 64. After pressing the sponge sheet 64 with heats by use of the fixation head 97, the projections 93 are deformed to put in the polyurethane sponge 96. Thereby, the sponge sheet 64 is secured to the bottom cover 46. Afterwards, the film unit 11 and the pressure plate 32 are contained in the case body 30, which is coupled to the bottom cover 31.

In attaching the bottom cover 31, the engaging ribs 37 are fit in the engaging grooves 55 by sliding the bottom cover 31 from behind the case body 30. When the bottom cover 31 is slid further, the projections 57 are engaged with the recesses 58, and the rear wall 73 of the case body 30 comes in contact with the rear wall 48 of the bottom cover 31. Thus, the bottom cover 31 is positioned at a predetermined position below the case body 30. On account of positioning the bottom cover 31 by use of two recesses 58 and the rear wall 73 of the case body 30, if one of the projections 57 and the rear wall 48 of the bottom cover 31 is damaged, it is possible to hold the bottom cover 31 at the predetermined position by engaging or contacting remaining two parts with the case body 30.

The top surface 37a of the rib 37, which is inclined, comes in contact with the bottom surface 50a of the engaging ridge 50, which is inclined so as to fit the inclination of the top surface 37a, so the rib 37 is fit in the engaging groove 55. Moreover, inclination of the lateral side wall 30a in a lower portion, indicated by the angle A in FIG. 2, is smaller than that in an upper portion, indicated by the angle B, so it is possible to increase the area where the top surface 37 comes in contact with the bottom surface 50a, without increasing the size of the bottom cover 31. Accordingly, the pack case 30, firmly engaged with the bottom cover 31, is not separated from the bottom cover 31, even when the film pack 10 is fallen down on the ground in loading the film pack 10 in the pack holder 60.

The film pack 10 is used for photography by loading in the pack holder 60. In each photography, the film unit 11 is withdrawn out of the film pack 10 in the same way as above. After all of film unit 11 is consumed, the film pack 10 is taken out of the pack holder 60, and the sponge sheet 64 is twisted out of the bottom cover 31. Since the polyurethane sponge 96 is glued to the paper base member 95, the sponge sheet 24 is separated from the projections 93 without being torn up. As for an elastic body to keep the image receiving sheet 25 from moving, any material with flexibility and elasticity, such as a non woven fabric, are applicable instead of the polyurethane sponge 96.

Thus, the present invention is not to be limited to the above embodiments, but on the contrary, various modifications are possible to those skilled in the art without departing from the scope of claims appended hereto.

What is claimed is:

1. An instant photo film pack, loaded in a pack holder, containing plural instant photo film units in light-tight fashion, said instant photo film unit including a photosensitive sheet, an image receiving sheet and a withdrawing sheet, said image receiving sheet being overlapped onto said photosensitive sheet to transfer an exposed image on said photosensitive sheet to said image receiving sheet as a positive image, said instant photo film pack comprising:

a box-shaped case body formed from plastic material, said case body having a top wall and main side walls, said top wall has an exposure opening for allowing exposure to said photosensitive sheet;

a pressure plate formed from plastic material, said pressure plate being provided inside said case body between a plurality of stacked said photosensitive sheets and a plurality of stacked said image receiving sheets, said pressure plate pressing said photosensitive sheets toward said exposure opening;

a bottom cover formed from plastic material, said bottom cover having a bottom plate for covering bottom side of said case body, bottom side walls stretched upward from said bottom plate, and engaging ridges integrated with said bottom side walls and projected toward inside of said bottom cover, bottom surfaces of said engaging ridges having inclined planes that increases the height of said engaging ridges gradually toward edges thereof; and a pair of ribs provided on the bottom of said main side walls, top surfaces of said ribs being inclined so as to fit said inclined planes, said ribs putting into engaging grooves formed in spaces surrounded by said bottom plate, said bottom side walls and said engaging ridges, so that said bottom cover being secured to said case body.

2. An instant photo film pack as defined in claim 1, wherein said main side walls are inclined to narrow the width of said case body gradually toward said top wall, inclination angle of said main side wall in an upper portion being larger than that in a lower portion.

3. An instant photo film pack as defined in claim 2, wherein said bottom side walls have a pair of engaging projections, and said ribs have a pair of engaging recesses, said engaging projections being fit into said engaging recesses to secure said bottom cover at a predetermined position of said case body by sliding said bottom cover after insertion of said ribs into said engaging grooves.

4. An instant photo film pack as defined in claim 3, wherein said bottom cover has a bottom rear wall extended upward, said bottom rear wall coming in contact with a rear wall of said case body when said bottom cover is secured to said predetermined position.

5. An instant photo film pack as defined in claim 4, wherein said bottom cover has a pair of transmission flaps for transmitting biasing force of a pair of biasing members that are provided with said holder, said engaging ridges having a pair of cutouts for allowing said transmission flaps to come in contact with said pressure plate.

6. An instant photo film pack as defined in claim 5, wherein said bottom plate has a pair of pod protection ridges on both inner lateral sides of an area on which a developing solution pod of said instant photo film unit is positioned.

7. An instant photo film pack as defined in claim 6, wherein said bottom cover has a plurality of pod protection projections on inner corner of said bottom rear wall and said bottom plate, said pod protection projections coming in contact with a bottom edge of said rear wall of said case body when said top wall and said bottom plate are depressed.

8. An instant photo film pack as defined in claim 7, wherein said bottom plate has reinforcement ridges on inner wall.

9. An instant photo film pack as defined in claim 8, wherein said bottom plate includes a mark for indicating prohibition of depression on an area of outer wall where said developing solution pod is positioned.

10. An instant photo film pack as defined in claim 9, further comprising:

a sheet-type elastic member attached to a leading portion of said bottom cover, said elastic member coming in contact with said image receiving sheet to exert frictional force for preventing said image receiving sheet from moving before said image receiving sheet becomes laid on said photosensitive sheet during pulling of each of said instant photo film units;

at least one attachment hole formed through said elastic member; and at least one attachment projection integrated with said bottom cover, a top portion of said attachment projection being cut into said elastic member to attach it, by deforming said attachment projection by heat and pressure after insertion of said attachment projection into said attachment hole.

11. An instant photo film pack including a pack case formed from plastic material, and a plurality of instant photo film units contained in said pack case;

said pack case including a box-shaped case body having an exposure opening in a top wall, a bottom cover for covering bottom side of said case body, and a pressure plate provided between said case body and said bottom cover, pressing said instant photo film unit toward said exposure opening;

said instant photo film unit being folded inside said pack case, including a photosensitive sheet located above said pressure plate so as to be confronted with said exposure opening, an image receiving sheet located below said pressure plate, and a withdrawing sheet that is connected with said photosensitive sheet, said image receiving sheet being laid on said photosensitive sheet to transfer an image on said photosensitive sheet to said image receiving sheet as appositive image by pulling said withdrawing sheet;

said instant photo film pack comprising:
      a sheet-type elastic member attached to a leading portion of said bottom cover, said elastic member coming in contact with said image receiving sheet to exert frictional force for preventing said image receiving sheet from moving before said image receiving sheet becomes laid on said photosensitive sheet during pulling of each of said instant photo film units;

at least one attachment hole formed through said elastic member; and at least one attachment projection integrated with said bottom cover, a top portion of said attachment projection being cut into said elastic member to attach it, by deforming said attachment projection by heat and pressure after insertion of said attachment projection into said attachment hole.

12. An instant photo film pack as defined in claim 11, wherein said attachment projection is heated at a temperature not to melt said elastic member.

13. An instant photo film unit as defined in claim 12, wherein said elastic member is extended in a withdrawing direction of said instant photo film unit.

14. An instant photo film unit as defined in claim 13, wherein said attachment projection has a cylindrical shape and a height shorter than a thickness of said elastic member.

15. An instant photo film unit as defined in claim 14, wherein two attachment projections and two attachment holes are arranged in a direction perpendicular to said withdrawing direction.

16. An instant photo film unit as defined in claim 15, wherein said elastic member is stuck to a paper base member.

17. An instant photo film unit as defined in claim 16, wherein said elastic member is a sponge sheet made of polyurethane.

18. A method for producing an instant photo film pack, said instant photo film pack including a pack case which is comprised of a case body, a bottom cover and a pressure plate, and a plurality of instant photo film units contained in said pack case;

said instant photo film unit including a photosensitive sheet, an image receiving sheet, a withdrawing sheet connected with said photosensitive sheet, and a developing solution pod disposed in said withdrawing sheet, said image receiving sheet being laid on said photosensitive sheet to transfer an image on said photosensitive sheet to said image receiving sheet as appositive image, by pulling said withdrawing sheet;

said method comprising steps of:

A. forming said case body, said bottom cover and said pressure plate from plastic material by injection molding, said case body having an exposure opening in a top wall and a pair of ribs on a bottom of main side walls, said bottom cover having a bottom plate for covering a bottom side of said case body, bottom side walls stretched upward from said bottom plate, and engaging ridges integrated with said bottom side walls and projected toward inside of said bottom cover, bottom surfaces of said engaging ridges having inclined planes that increases the height of said engaging ridges gradually toward edges thereof, top surfaces of said ridges being inclined so as to fit said inclined planes;

B. attaching an elastic member for exert frictional force for preventing said image receiving sheet from moving before said image receiving sheet becomes laid on said photosensitive sheet during pulling of each of said instant photo film units;

C. bending said instant photo film unit such that said photosensitive sheet is located above said pressure plate and said image receiving sheet is located below said pressure plate, and putting said instant photo film unit and said pressure plate in said case body such that said photosensitive sheet is confronted with said exposure opening; and D. inserting said ribs into engaging grooves formed in spaces surrounded by said bottom plate, said bottom side walls and said engaging ridges, and sliding said bottom cover along said ribs.

19. A method as defined in claim 18, wherein said main side walls are inclined to narrow the width of said case body toward said top wall, inclination angle of said main side wall in an upper portion being larger than that in a lower portion.

20. A method as defined in claim 19, wherein said step B further comprising steps of:

inserting at least one attachment projection provided integrally with said bottom cover into at least one attachment hole formed through said elastic member;

pressing a fixation head onto a top surface of said attachment projection;

heating said fixation head to deform said attachment projection until a top surface becomes larger than the original size of said attachment hole; and moving said fixation head away from said attachment projection.

21. An instant photo film unit as defined in claim 20, wherein said attachment projection has a cylindrical shape and a height shorter than a thickness of said elastic member.

22. An instant photo film unit as defined in claim 21, wherein two attachment projections and two attachment holes are arranged in a direction perpendicular to said withdrawing direction.

* * * * *